United States Patent [19]
Willison

[11] Patent Number: 4,640,406
[45] Date of Patent: Feb. 3, 1987

[54] ROTATIONAL AND RETRACTABLE CONTAINER HOLDING DEVICE AND CONVEYOR THEREFOR

[75] Inventor: Beverly G. Willison, Akron, Ohio

[73] Assignee: Feco Engineered Systems, Inc., Cleveland, Ohio

[21] Appl. No.: 657,244

[22] Filed: Oct. 3, 1984

[51] Int. Cl.$^4$ ............................................. B65G 17/32
[52] U.S. Cl. ................................. 198/377; 198/379; 198/470.1; 198/476.1
[58] Field of Search .............. 198/377, 379, 477, 478, 198/479, 470.1, 471.1, 472.1, 476.1, 477.1, 378

[56] References Cited

U.S. PATENT DOCUMENTS

| | | | |
|---|---|---|---|
| 3,269,516 | 8/1966 | Lucas | 198/377 |
| 3,469,670 | 9/1969 | Cartwright | 198/484 X |
| 3,841,687 | 10/1974 | Banyas et al. | 198/477 X |
| 3,885,825 | 5/1975 | Amberg et al. | 198/377 X |
| 3,944,058 | 3/1976 | Strauss | 198/477 |
| 4,026,999 | 5/1978 | McDonald | 198/377 |
| 4,096,937 | 10/1978 | Wallace | 198/377 |
| 4,435,146 | 3/1984 | Wiatt et al. | 198/479 X |

FOREIGN PATENT DOCUMENTS 633771 11/1978 U.S.S.R. ............................. 198/479

Primary Examiner—Robert J. Spar
Assistant Examiner—Michael Stone
Attorney, Agent, or Firm—Patrick J. Walsh

[57] ABSTRACT

A rotational and retractable container holding device and conveyor therefor in which a conveyor member is supported in cantilever fashion by support members extending along the conveying path. A plurality of container holding devices extends in a generally horizontal orientation from one side of the conveyor member and include an inner housing slidably mounted on a supporting spindle, an outer housing rotatably mounted with respect to the inner housing and slidably mounted with respect to the spindle, and a container gripping member at the outer end of the outer housing for gripping a container by its neck. The container holding device and its conveyor are particularly suited for receiving newly formed containers and for conveying the containers through a series of bottle forming operations including coating, decorating and so forth.

4 Claims, 14 Drawing Figures

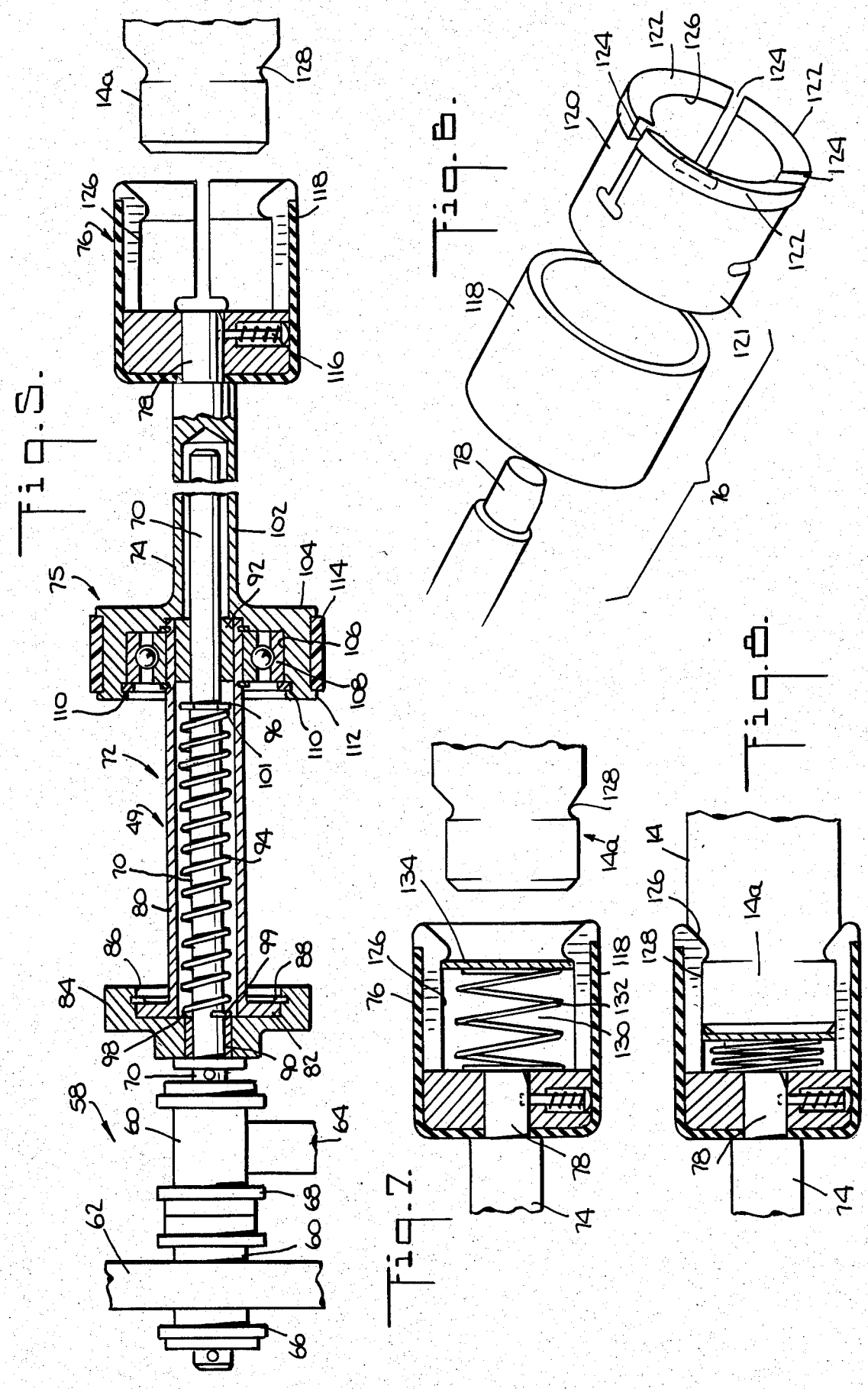

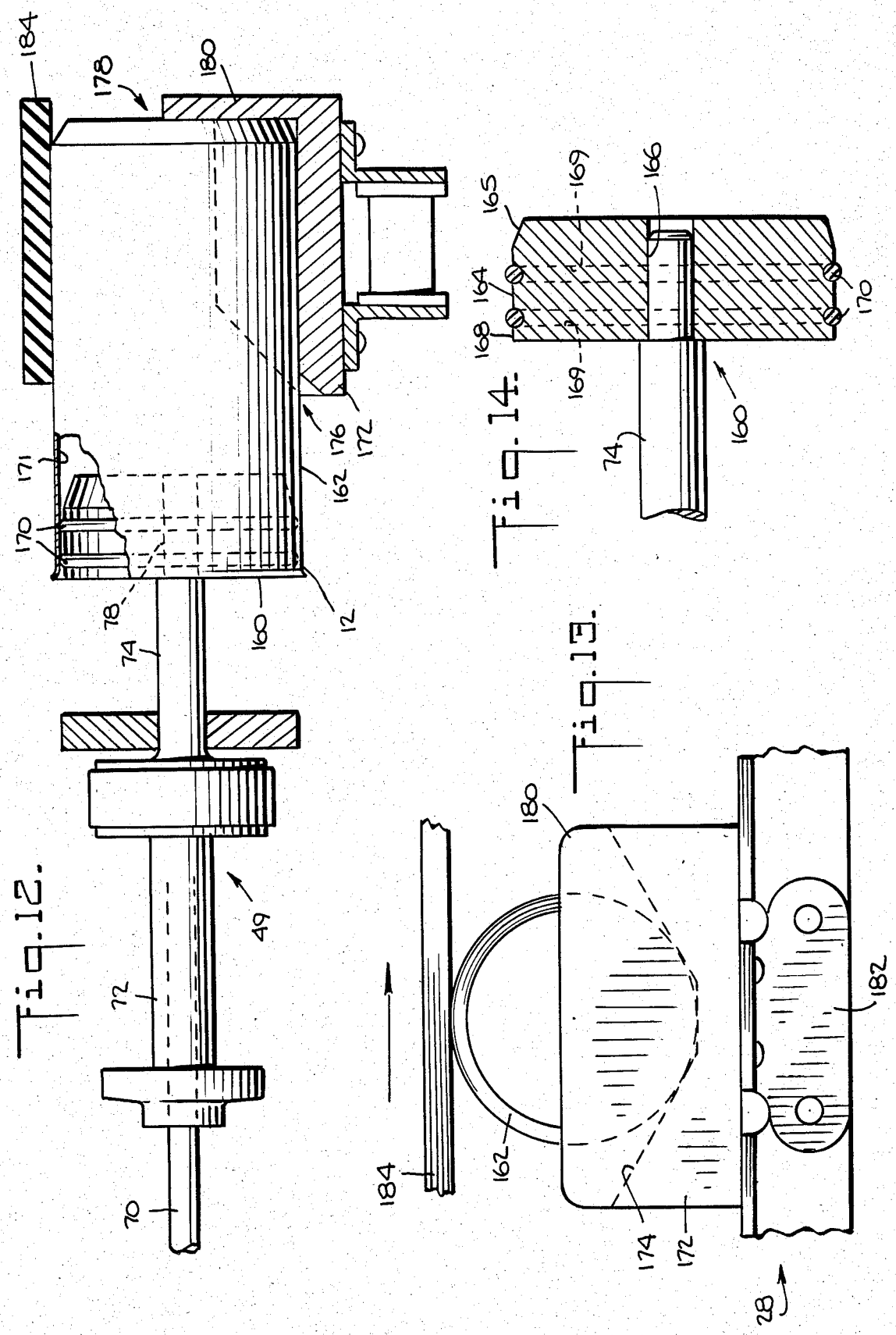

ROTATIONAL AND RETRACTABLE CONTAINER HOLDING DEVICE AND CONVEYOR THEREFOR

BACKGROUND OF THE INVENTION

Soft drinks such as carbonated sodas are now commonly packaged in plastic containers known as PET containers for sale to retail consumers. Additionally, other plastic containers are being used or being developed for packaging beer, salad dressing, and other foods and for packaging cosmetics, pharmaceuticals, and other items.

These plastic containers undergo a number of different operations in a container and/or filling plant including formation, washing, applying and curing barrier coating, labelling, and filling.

The present invention is directed to a device for handling plastic containers and for carrying them through various operational steps so that the entire exterior surface of the containers is exposed and available for desired spray coating or other operations. In one form, the invention is suited for containers having threaded necks and protects the necks from being coated or otherwise damaged. Another form is suited for containers having an open end such as beer containers and provides full exposure of the entire exterior surface for spray coating, and so forth, while protecting the interior of the container from spray coating. Additionally, the device is suited for use with a system capable of distinguishing between carrying devices having and not having containers.

SUMMARY OF THE INVENTION

A container handling system with which a device according to the present invention may be used, includes an infeed conveyor for delivering newly formed, uncoated plastic containers in single file to the container handling system. In a typical system, the containers are received by a flighted transfer conveyor in upright condition. The transfer conveyor will reorient the container to a substantially horizontal position moving in timed and spaced relationship to a series of container holding devices of the present invention being moved on a carrier conveyor.

The carrier conveyor is positioned adjacent the transfer conveyor for collecting the horizontally oriented containers and carrying them through a series of finishing operations. The carrier conveyor includes an endless conveying member in the form of an endless chain suitably mounted and driven. A series of container holding devices is fitted to the carrier chain for movement in timed and spaced relationship to containers on the transfer conveyor. In one form of the invention, the container holding devices advance toward and grip each container at its neck removing it from the transfer conveyor then moving the containers to subsequent finishing operations. By this manner of carriage the entire container below its neck ring is exposed for coating, labelling, printing and so forth but the thread and the inside of the container are protected. In another form of the invention, the container holding devices advance toward and grip containers at their open ends, as in the case of beer containers, thereby exposing the entire exterior surface of each container for coating, labelling, printing, etc.

In a typical finishing operation, the moving container holding devices position the containers within a coating chamber, rotate the containers within the coating chamber to assure full and uniform coating of the containers and to provide sufficient rotational movement so that the coating does not sag or drip but is evenly distributed, and thereafter move the containers into and through a curing oven. Copending application Ser. No. 667,741, filed Oct. 31, 1981 discloses a method and apparatus for applying and curing coatings of plastic containers.

In cases where one or more container holding devices has not received a container, an arrangement is made to direct that device along a separate path so that it does not become involved in subsequent finishing operations such as coating, since the gripping head without the container would be covered with coating thereby fouling the mechanism.

OBJECTS OF THE INVENTION

It is an object of the present invention to provide a rotational and retractable container holding device for moving containers, particularly plastic containers through a series of finishing operations such as applying an exterior barrier coating to the containers and thereafter curing the coating such that the container is ready to receive consumer products such as carbonated soda, ketchup, beer, cosmetics, and so forth.

A further object of the present invention is to provide a device for receiving, holding, rotating, and moving each container through a series of finishing operations.

It is a further object to provide an arrangement so that any container holding device not receiving a container will travel a separate path than those receiving containers.

A further object is to provide a container holding device for gripping containers by the neck so that the entire exterior surface of the container is free to receive such finishing operations as barrier coating, inspection, labelling, and printing but protecting the threaded part of the neck and the interior of the container from being coated of damaged.

Another object is to provide a container holding device for gripping containers by insertion into the open end thereof, so that the entire exterior surface of the container is exposed to finishing operations such as coating, inspection, labelling, and printing.

A further object of the invention is to provide a container holding device for travelling in spaced, timed relationship with a container transfer conveyor, for closing the space between a device and container, for engaging and removing the containers from the transfer conveyor, and for rotating the containers if desired for a barrier coating or other operation.

Another object of the invention is to provide a container holding device capable of cooperating with a container handling system in order to differentiate between holding devices receiving containers and those not.

Other and further objects will become apparent to those skilled in the art upon an understanding of the specification hereof, or will occur upon employment of the invention in practice.

DESCRIPTION OF THE DRAWINGS

A preferred embodiment of the invention has been chosen for purposes of illustration and is shown in the accompanying drawing of which:

FIG. 5 is a plan view in section showing the mounting arrangement for a container handling device and its assembled internal components for receiving, holding, rotating, and moving each container through a series of operations.

FIG. 6 is an exploded perspective view illustrating the components of one embodiment of a container gripping head.

FIGS. 7 and 8 are section views of a modified container gripping head with a protective diaphragm inside the head, and together the figures show sequential gripping of a container by its neck.

FIG. 12 is a side elevational view of a modified form of the present invention illustrating a container handling device for engaging and gripping the interior surface of a container at its open end as it is positioned by a transfer conveyor.

FIG. 13 is an end view of the container handling device and carrier conveyor of FIG. 12.

FIG. 14 is section view of a mandrel carried by the container handling device of FIG. 12.

DETAILED DESCRIPTION OF THE INVENTION

Figure 1:
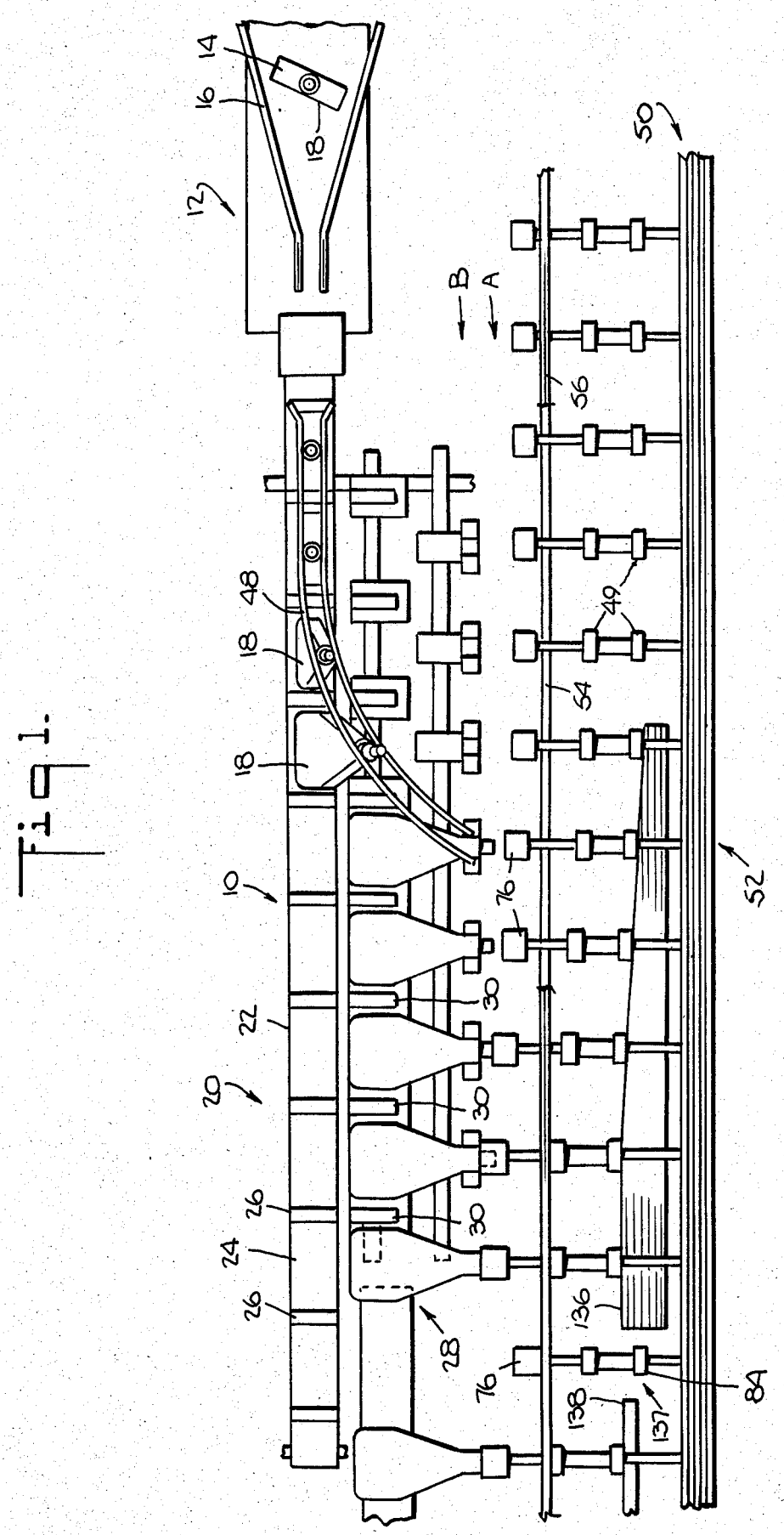
FIG. 1 is a fragmentary plan view showing a container transfer system including infeed conveyor, transfer conveyor, and container holding device conveyor, with which the present invention may be used.

Referring now to FIG. 1, the container handling system 10 includes an in-feed conveyor 12 for moving flat-sided containers 14 through an orienting chute 16 where they are oriented to a position with sidewalls 18 substantially parallel to the direction of conveyance. For other containers having cylindrical bodies, a different sort of chute would be used sufficient to single file the containers for delivery to a transfer conveyor. The transfer conveyor 20 (FIG. 1) includes an entry conveyor 22 comprising an endless flighted conveying belt 24 for receiving individual containers in position between subsequent flights defined by sidewall members 26 evenly spaced along the conveying surface. The transfer conveyor also includes a body support conveyor 28 which is flighted, and has upstanding divider members 30 for supporting and positioning containers after they have been reoriented from the vertical to horizontal positions. Typically each flight will include spaced divider members 30 and an intermediate flat member 32 on which the container now rests in a horizontal position. The shape and arrangement of these flighted conveyor members is suitable for the container configuration illustrated in FIGS. 1–4. It is to be understood that the configuration of the transfer conveyor flight sections may be modified as desired to conform with different container configurations including cylindrical containers as disclosed in copending application Ser. No. 647,297 filed Sept. 4, 1984.

The transfer conveyor also includes a container neck support and positioning conveyor 34 including a series of supporting cradles 36 having wing shaped cradle members 38 for engaging and supporting the neck of each container. The neck cradles 38 are aligned centrally of the body supporting segments 32 and cooperate therewith to provide adequate support and proper positioning of each container on the transfer conveyor. See particularly FIGS. 3 and 4.

Each of the entry, transfer, and neck conveyor segments 24, 26, 30, 32, and 36 are mounted for movement in the conveying direction by suitable brackets (not shown) affixing them to the spaced chain conveyors 42. The conveyor chains are carried over sprockets mounted on a suitable driveshaft in a known manner.

Figure 2:
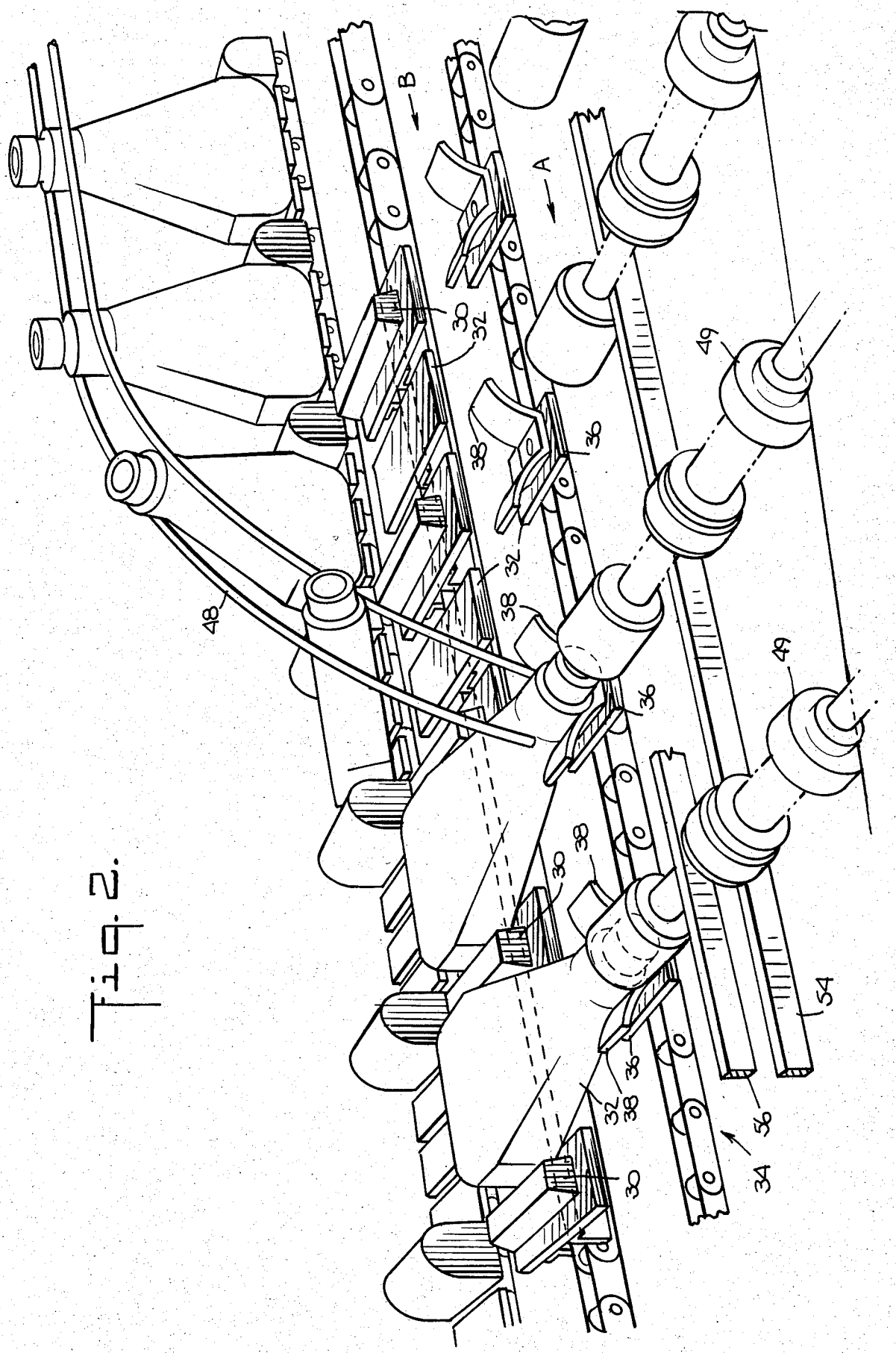
FIG. 2 is a perspective view corresponding to FIG. 1 showing the containers being reoriented from the vertical to the horizontal and showing in sequence the action of loading containers onto the container holding mechanism of the present invention.
Figure 3:
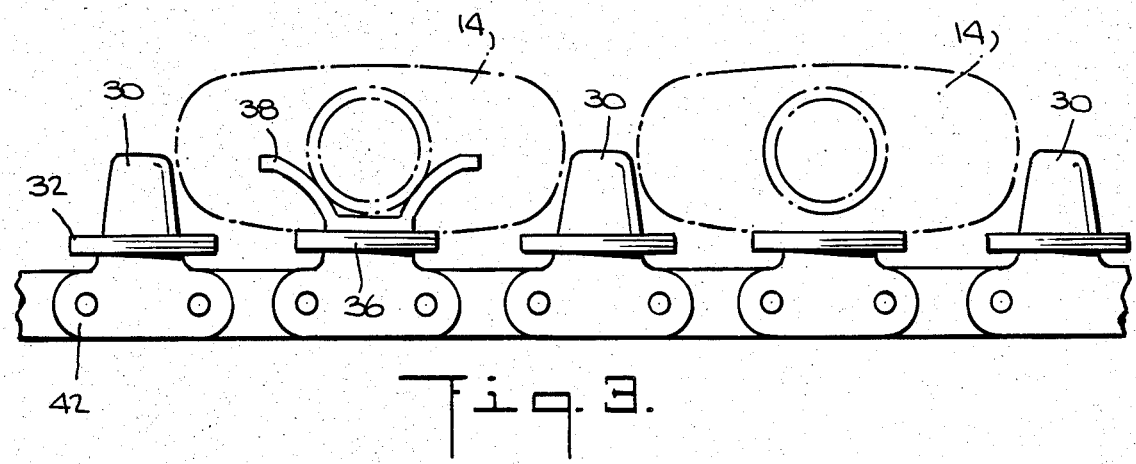
FIG. 3 is a side elevational view of a flighted transfer conveyor for supporting the containers in the horizontal position.
Figure 4:
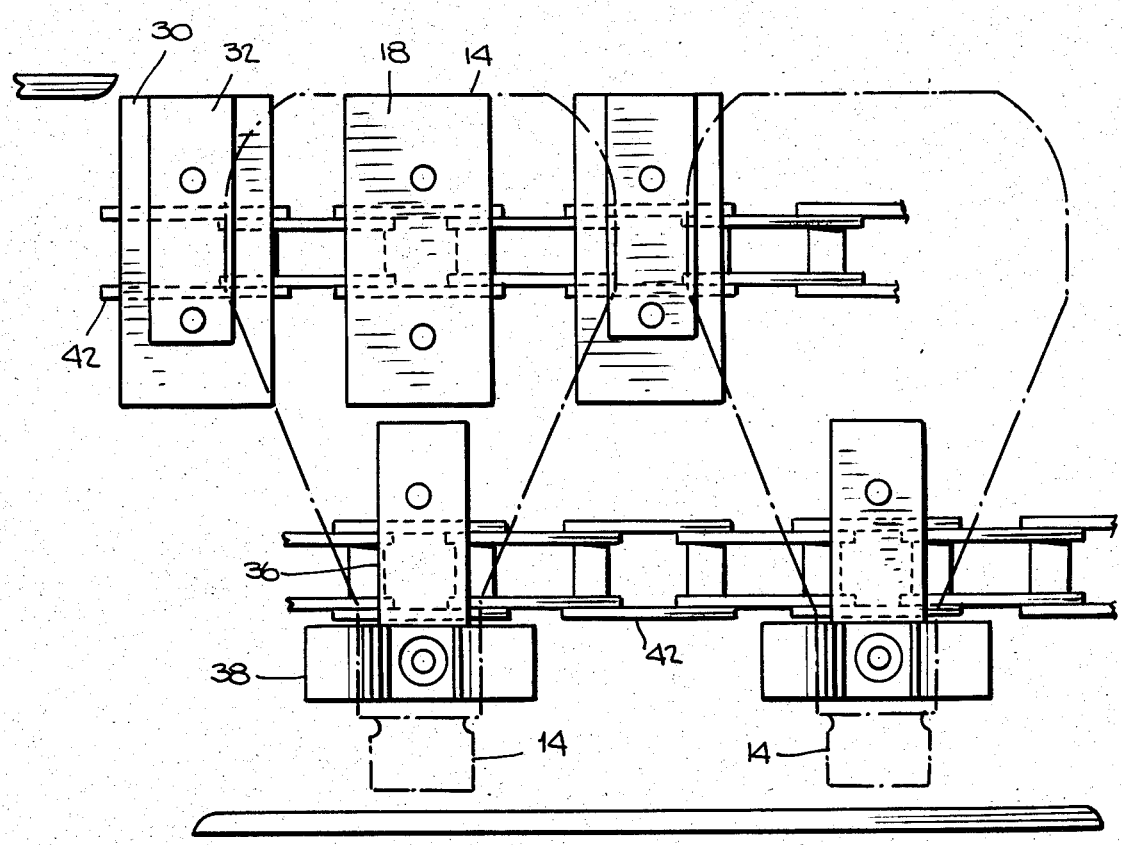
FIG. 4 is a plan view corresponding to FIG. 3.

As shown in FIGS. 1–3 the transfer conveyor also includes a neck engaging guide 48 for guiding each moving container from vertical to horizontal orientation so that the container is effectively transferred laterally from its entry conveyor member to the body support conveyor and the neck support conveyor. It is to be understood, of course, that each segment of the transfer conveyor moves in spaced and timed relation with the carrier conveyor 50 which carries individual container holding devices 49 as is best shown in FIGS. 1 and 2.

The container carrier conveyor 50 includes a conveyor 52 moving in timed relation with the transfer conveyor and includes spaced supporting 54 and retaining 56 rails for supporting the container holding mechanisms 49 at their outer ends.

The carrier conveyor mechanism includes a carrier chain 58 of double links 60 (FIG. 5) being supported in cantilever fashion along runner rails 62, 64 positioned respectively above the outer chain 66 and below the inner chain 68 runner surfaces. A pin member 70 is fixed to the chain and extends substantially the full length of the container holding devices 49. This carrier pin and the chain are oriented to hold the containers in horizontal position as they move throughout the finishing operation.

Figure 9:
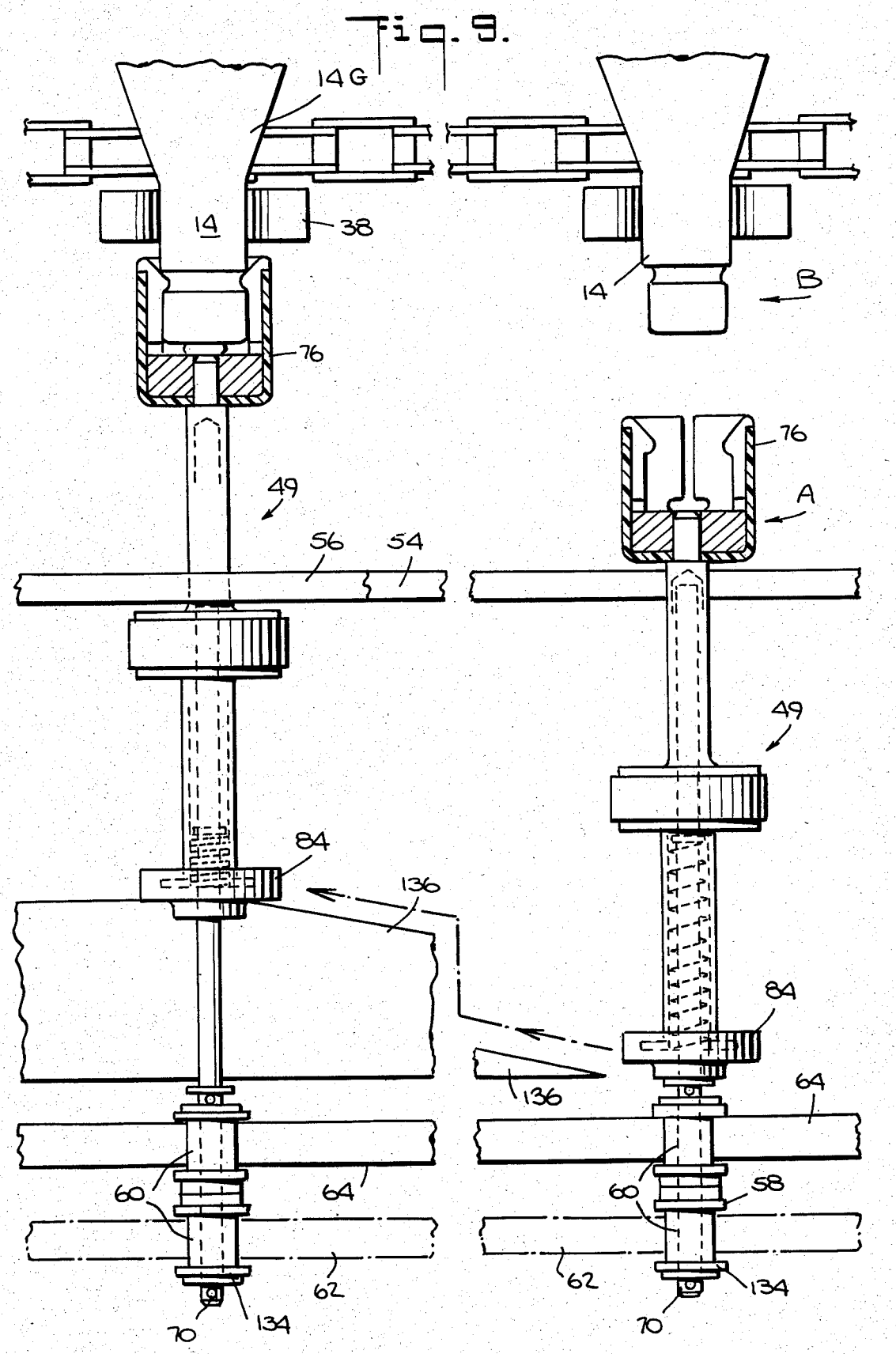
FIG. 9 is a plan view illustrating the sequential movement of the carrier conveyor and container holding and rotating devices as they engage containers on the transfer conveyor.

As shown in FIGS. 1, 2 and 9 each container holding device 49 travels in timed and spaced relationship and along a path A parallel to the path B travelled by containers on the transfer conveyor. Additionally, the container holding devices are aligned with individual containers such that by extending the devices across the space between parallel paths, each device engages and grips a container by the neck. After the container is securely gripped, the transfer conveyor and carrier conveyor follow diverging paths and the container holding device carries its container through a subsequent finishing operation.

As best shown in FIGS. 5 and 9 each container handling device includes a central mounting pin supported in cantilever fashion by carrier chain 58, an inner housing 72 mounted for sliding axial movement on pin 70, an outer housing 74 rotatably mounted at 75 to the inner housing, and a container gripping head 76 secured to the outer end 78 of the outer housing.

Inner housing 72 includes a tubular central body 80 and end flange 82 assembled to disk-shaped cam follower 84 at recess 86. The cam follower and flange are secured by a suitable retainer ring 88. The inner housing assembly is mounted for axial sliding movement along pin 70 by means of spaced slide bearings 90, 92. A compression spring 94 is fitted over pin 70 within tubular central body 80 and bears against collar 96 and an internal shoulder 98 of recess 86.

Collar 96 is fixed to pin 70, and the extremities 99 and 101 of the spring may be retained by the end flange 82 and by collar 96 to resist rotation of the inner housing assembly with respect to the pin.

The outer housing 74 includes integral tube 102 and flange 104 members. The flange is recessed at 106 to receive a roller bearing 108 fitted to and retained on tubular central body 80 by rings 110. The outer circumference 112 of the flange is fitted with a cylindrical belt 114 serving as a friction surface by which the outer housing is rotated.

The outer end 78 of housing 74 is of reduced diameter for receiving a container gripping head 76 of suitable configuration. The head is attached to housing end 78 by a suitable fastener 116 such as a spring loaded rivet 116 held in place by a cylindrical elastic collar 118 encircling the head. Preferably the gripping head is an open ended collet 120 fitted to the end 78 of the outer housing. The collet 120 (FIG. 6) is generally cylindrical with the cylindrical wall 121 being divided into several segments 122 preferably three by means of slits 124 extending from the open end of the collet to a point intermediate to the cylindrical wall. The three segments acting together will "snap over" the container's neck 14a and support the container. The inner contour 126 of the collet engages the exterior contour 128 of the container neck 14a. The collar 118 is elastic and encircles the collet for urging the segments into operative neck engaging position.

If desired, the interior 130 of the gripping head may be protected by a spring 132 loaded diaphragm 134. See FIGS. 7 and 8. The diaphragm will exclude coating of other sprays applied to the containers during spray coating operations. Such coating would accumulate on the gripping head, diminish its effectiveness, and require periodic cleaning.

The operation of the container holding device is best shown in sequence in FIG. 9. In the right hand view, the carrying chain is 58 supported by the over and under cantilever supporting rails. It is to be understood that the pins are mounted in spaced and parallel relationship to each other on the continuous and endless carrier chain. The internal support pin 70 is mounted through the hub 134 of the chain link and extends internally substantially the full length of the container holding device 49. The free end of the carrier member is supported in sliding or rolling friction by a supporting and retaining rails 54 and 56.

For loading containers, the cam follower 84 engages cam surface 136 and extends the device 49 in an axial direction against the compression force of internal spring 94. As the gripping head 76 and container 14 are moving in timed relation and in registry with one another, the head engages and secures the individual containers shown at the left hand side of FIG. 9. It will be observed that the engagement of the carrier cradle 38 with the shoulder 14G of the container is sufficient to maintain the head in extended position so that the container holding devices can successfully negotiate a gap 137 between cam members 136 and 138 best shown in FIG. 1. As noted above holding devices not engaging a container do not have this retaining engagement and consequently they will be retracted by the force of its internal spring 94 through the cam gap and follow a separate path from container bearing carriers throughout the container operation, such as coating.

Figure 10:
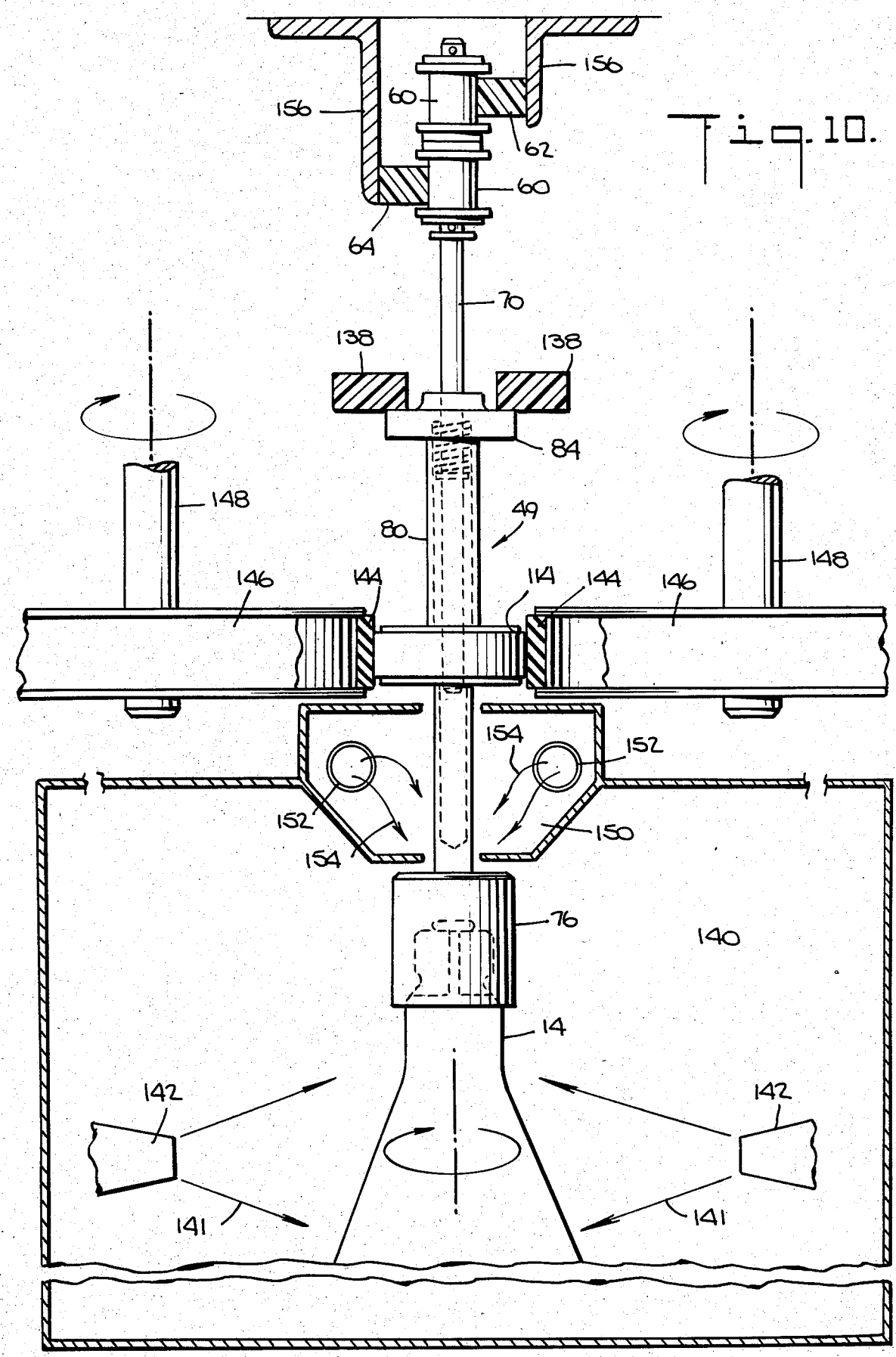
FIG. 10 is a plan view in section of the container holding and rotating device according to the present invention as it carries a container through a barrier coating spraying operation.
Figure 11:
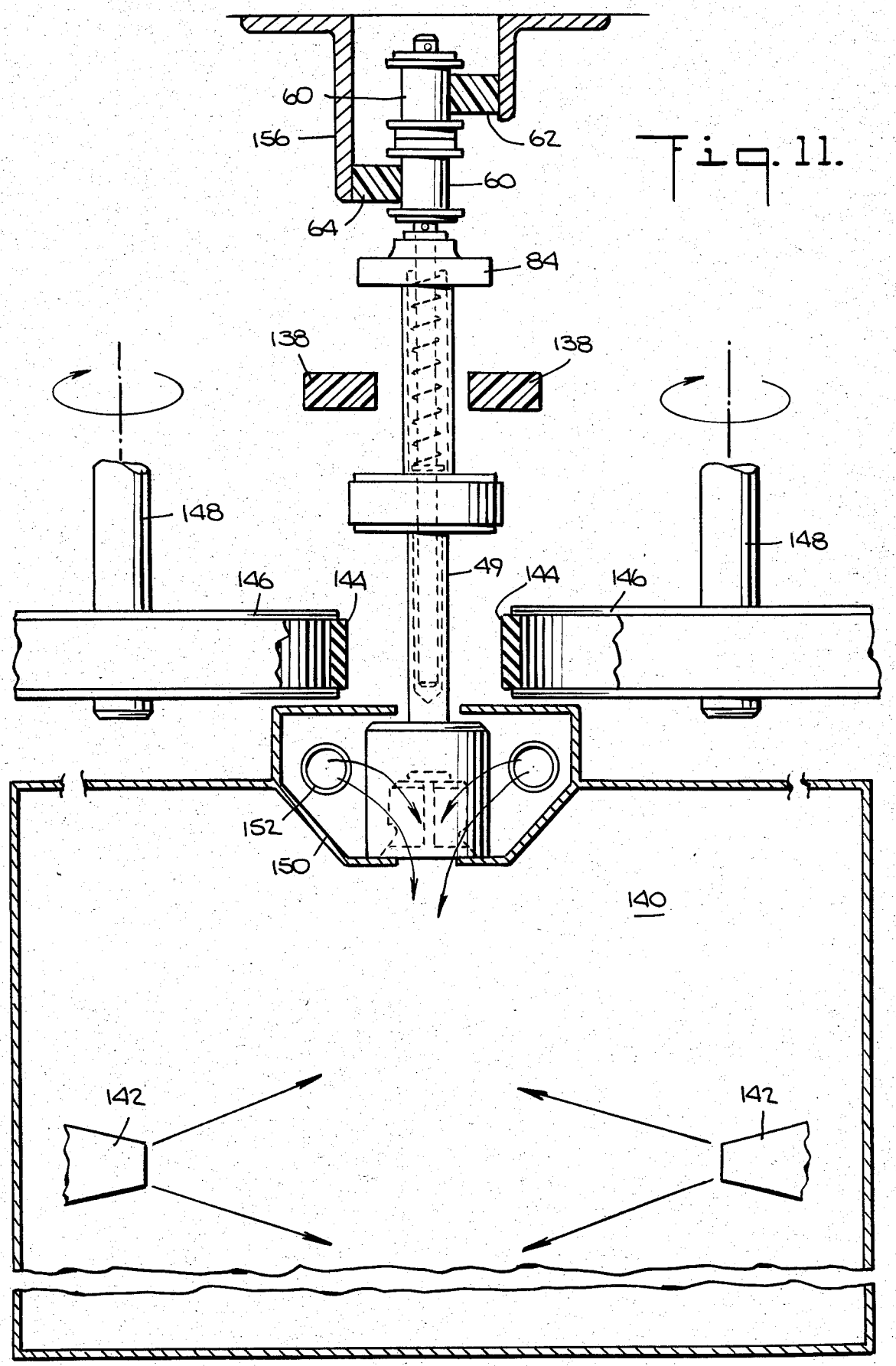
FIG. 11 is a view corresponding to FIG. 10 and showing the relative position of a device having no container loaded to the gripping head. The gripping head is retracted and travels outside of the spray chamber protected from the spray.

FIGS. 10 and 11 respectively illustrate the position and operation of a container holding device which has received a container and travels along an active path in engagement with cam surfaces 138 and a device without container travelling an inactive path out of engagement with cams 138. In FIG. 10, the device 49 has positioned container 14 within a coating member 140 to receive a barrier coating 141 sprayed by nozzles 142. The position of the container within the chamber is determined by location of cam surfaces 138 acting on cam follower 84. The frictional contact between cams and follower further aids in preventing rotation of inner housing 80 on pin 70. A pair of cooperating drive belts 144 on drive wheels 146 located on opposite sides of the holding device are driven in a common direction by shafts 148. The drive belts engage belt member 114 for the purpose of rotating the outer housing and container within the coating chamber. Such container rotation is desirable to assure even reception of the coating by the container during spraying, and to prevent dripping or sagging of the coating before it is cured.

It will be observed that by virtue of the neck gripping of the container, the entire outer surface of the container is available for reception of the barrier coating. Additionally the neck itself and the container interior are shielded from the coating which would be unwanted in these areas.

An antechamber 150 houses pipes 152 which direct a water mist 154 into the coating chamber to achieve desired humidity levels in the chamber. In FIGS. 10 and 11, the container holding device is oriented horizontally and is travelling vertically through the coating chamber with cantilever support from rails 62 and 64 affixed to brackets 156.

The container holding device of FIG. 11 is inactive in that it has not received a container from the transfer conveyor. Consequently the device 49 is fully retracted with head 76 travelling within the antechamber 150 without rotation, and with cam follower 84 disengaged from cam surfaces 138.

A modified form of the invention is illustrated in FIGS. 12-14. As shown, a container holding device 49 as described and illustrated in FIGS. 1-11 includes internal pin member 70, inner housing 72, and outer housing 74 having an outer end 78 for receiving a container gripping mandrel 160. This modified container holding device with mandrel 160 is particularly suited to receiving an open ended cylindrical container 162 used typically for packaging beer. The mandrel includes a generally cylindrical main body portion 164 being bevelled at its leading edge 165 for ease of insertion into the container end. The mandrel has an axial bore 166 and suitable fastener (not shown) for quick fitting and removal of the mandrel. The outer surface 168 of the mandrel is provided with a plurality of grooves 169 for receiving O-rings 170 for engaging the interior surface 171 of a container for retaining container to mandrel.

The container holding device cooperates with a transfer conveyor 28 substantially in the manner described with respect to FIGS. 1-11. In the modified form of the invention of FIGS. 12-14, the transfer conveyor is fitted with a series of container pockets or cradles 172 for receiving containers 162 from a delivery system (not shown). Each container pocket includes a upwardly open V-shaped central body 174 open at one end 176 and closed at the other end 178 by an upstanding wall 180. Each pocket is mounted to the conveyor by suitable linkage 182.

The transfer conveyor further includes a moving overhead pressure belt 184 for engaging the top portion of each container in a manner more specifically described in copending application Ser. No. 647,297 filed Sept. 4, 1984. The overhead belt gently presses and holds each container in its cradle.

In operation, the container holding device and the transfer conveyor move in spaced timed relation to one another and as described above the container holding device engages the open end of the container. In FIG. 12 the mandrel engages the inner open end of the container thereby exposing the entire outer surface of the container for coating, labelling, printing and so forth.

It will be apparent to those skilled in the art that various modifications can be made in the container holding device without departing from the scope or spirit of the invention.

I claim:

1. A container holding device for receiving and gripping containers for conveying through one or more operating stations being adapted for mounting on chain conveyor unit having a plurality of links for supporting containers in a generally horizontal orientation comprising an elongated spindle attached at one of its ends to a conveyor link and extending laterally from one side of the conveyor unit, an inner housing including a tubular portion for internally receiving the spindle, and a cam follower forming part of the inner housing at its end adjacent the conveyor unit, the inner housing and cam follower as a unit being mounted for telescoping movement with respect to the spindle, means cooperating with the inner housing and the spindle for biasing the inner housing into a first telescoped position with respect to the spindle, an outer housing mounted at the other end of the inner housing for rotation about the spindle axis and the inner housing, the outer housing having means for engaging and gripping a container by its neck, whereby said inner and outer housing are adapted for axial sliding movement with respect to the spindle from the first telescoped position to a second telescoped position for receiving a container and for rotary movement of the outer housing and container with respect to the inner housing and spindle for applying a coating to the container.

2. A container holding device for receiving and gripping containers for conveying through one or more operating stations being adapted for mounting on chain conveyor unit having a plurality of links for supporting containers in a generally horizontal orientation comprising an elongated spindle attached at one of its ends to a conveyor link and extending horizontally from one side of the conveyor unit, an inner housing including a tubular portion for internally receiving the spindle, and a cam follower forming part of the inner housing at its end adjacent the conveyor unit, the inner housing and cam follower as a unit being mounted for telescoping movement with respect to the spindle, means cooperating with the inner housing and the spindle for biasing the inner housing into a first telescoped position with respect to the spindle and defining the limit of travel of the inner housing toward a second telescoping position, an outer housing having a flange at one end, a bearing within the flange for receiving the other end of the inner housing for rotation about the inner housing and for telescoping movement with respect to the spindle, the outer housing having means for engaging and gripping a container by its neck, whereby said inner and outer housing are adapted for axial sliding movement with respect to the spindle from the first telescoped position to a second telescoped position for receiving a container and for rotary movement of the outer housing and container with respect to the inner housing and spindle for subsequent container operations.

3. A conveyor for receiving, holding and moving open ended containers comprising an endless chain conveyor member suitably mounted and driven for circulation through a conveying path passing through one or more finishing operations, means on said conveyor member for mounting a plurality of devices for supporting containers in a generally horizontal orientation; said devices including a support member having a longitudinal axis and being mounted at one end to the conveyor mounting member with said axis oriented horizontally, an inner housing fitted to the support member for telescoping movement along said axis, means located internally of the inner housing and cooperating with the support member for biasing the inner housing to a first telescoped position adjacent the conveyor member, an outer housing rotatably fitted to the inner housing for longitudinal and rotational movement with respect to said axis, means fitted to the outer housing for receiving and holding a container, the outer housing having means by which the containers may be rotated, said conveyor having means for moving the inner and outer housings from the first to the second longitudinal positions whereby the devices are adapted to grip and hold a series of containers moving in spaced, timed, and longitudinally aligned relationship for movement through said container operations.

4. A conveyor for receiving, holding and moving open ended containers comprising an endless chain conveyor member suitably mounted and driven for circulation through a conveying path passing through one or more finishing operations, a pair of support rails lying along the conveying path and engaging upper and lower portions of said chain conveyor in cantilever fashion, means on said conveyor member for mounting a plurality of devices for supporting containers in a generally horizontal orientation; said devices including a support member having a longitudinal axis and being mounted at one end to the conveyor mounting member with said axis oriented horizontally, an inner housing fitted to the support member for telescoping movement along said axis, means located internally of the inner housing and cooperating with the support member for biasing the inner housing to a first telescoped position adjacent the conveyor member, an outer housing rotatably fitted to the inner housing for longitudinal and rotational movement with respect to said axis, means fitted to the outer housing for receiving and holding a container, the outer housing having means by which the containers may be rotated, said conveyor having means for moving the inner and outer housings from the first to the second longitudinal positions whereby the devices are adapted to grip and hold a series of containers moving in spaced, timed, and longitudinally aligned relationship for movement through said container operations.

* * * * *